United States Patent [19]

Nakamura et al.

[11] Patent Number: 5,360,119
[45] Date of Patent: Nov. 1, 1994

[54] SEPARATOR FOR REMOVING FOREIGN MATERIALS IN GRANULATED MATERIALS

[75] Inventors: Teruyuki Nakamura, Ojiya; Yasunori Nitta, Sapporo, both of Japan

[73] Assignee: Kyowa Kogyo Co., Ltd., Ojiya, Japan

[21] Appl. No.: 114,224

[22] Filed: Sep. 1, 1993

[30] Foreign Application Priority Data

Sep. 3, 1992 [JP] Japan .............. 4-621705[U]

[51] Int. Cl.$^5$ .............................................. B07C 5/36
[52] U.S. Cl. ................................. 209/618; 209/669; 209/673
[58] Field of Search .............. 209/668, 618, 669, 671, 209/673, 910

[56] References Cited

U.S. PATENT DOCUMENTS

| | | | |
|---|---|---|---|
| 1,723,539 | 8/1929 | Bussard | 209/618 |
| 2,307,257 | 1/1943 | Davis | 209/673 X |
| 2,786,574 | 3/1957 | Clark | 209/669 X |
| 3,283,895 | 11/1966 | Rollins | 209/669 |
| 3,473,658 | 10/1969 | Bartlett, Jr. | 209/618 |
| 3,627,126 | 12/1971 | Fitzgerald et al. | 209/673 X |
| 4,471,876 | 9/1984 | Stevenson, Jr. et al. | 209/618 |
| 4,821,886 | 4/1989 | Roethig | 209/673 X |
| 5,024,335 | 6/1991 | Lundell | 209/669 X |
| 5,175,906 | 1/1993 | Holter | 209/618 X |

FOREIGN PATENT DOCUMENTS

3724240  2/1989  Germany .................. 209/669
63-122681  8/1988  Japan .

*Primary Examiner*—D. Glenn Dayoan
*Attorney, Agent, or Firm*—Kanesaka & Takeuchi

[57] ABSTRACT

A separator of the invention is designed to remove foreign materials, such as small stones, included in granulated materials, such as red beans, having smooth outer surfaces. The separator is formed of a supplying section, and a separating section for receiving the granulated materials with the foreign materials from the supplying section and separating the foreign materials from the granulated materials. The separating section includes at least one pair of elongated rollers formed of first and second rollers, which are arranged parallel to and at a predetermined distance spaced apart from each other. The first roller has a spiral projection on an outer surface thereof. When the granulated materials with the foreign materials are supplied onto one end of the pair of the rollers, the foreign materials are caught between the rollers and dropped downwardly, while the granulated materials are transferred to the other end of the rollers by the rotating spiral projection and are collected.

7 Claims, 3 Drawing Sheets

SEPARATOR FOR REMOVING FOREIGN MATERIALS IN GRANULATED MATERIALS

BACKGROUND OF THE INVENTION AND RELATED ART STATEMENT

The present invention relates to a separator for removing foreign materials, such as sands and small stones, contained in granulated or round materials, such as red beans, soybeans, sesame seeds, pepper corns and so on, packed in a bag.

In a packed granulated materials like red beans, foreign materials like small stones may be included. If the granulated materials are utilized or cooked as they are without removing the foreign materials, a product made by the granulated materials inevitably contains the foreign materials, which is not preferable.

For example, in case red beans are boiled and cooked for food, if foreign materials, such as small stones, are contained in packed red beans, the foreign materials may be included in the food. Thus, conventionally, when red beans are taken out of a pack, at first, the foreign materials, such as small stones, are removed by hands of a person, and after removing the foreign materials, red beans are boiled.

Removal of the foreign materials by hands is very troublesome. In order to reduce labour for this removal operation, the present inventors completed a device disclosed in Japanese Utility Model Application No. 62-14121.

In the device of Application No. 62-14121, for example, since red beans are transferred only by inclination of rollers, if red beans have shapes to be easily rotatable, red beans are transferred to the end of the rollers in a short period of time, so that the foreign materials removing operation can not be made sufficiently. Also, since the transfer of red beans on the rollers is made only by inclination of the rollers, the smooth transfer can not be made. Further, in case the device is stopped in a middle of the operation, red beans may still be transferred by rotation thereof due to inclination of the rollers.

The present invention has been made to obviate the problems, and is an improvement of Japanese Utility Model Application No. 62-14121.

Accordingly, one object of the invention is to provide a separator for efficiently removing foreign materials from granulated materials with smooth outer surfaces.

Another object of the invention is to provide a separator as stated above, wherein the foreign materials can be removed regardless the size thereof.

A further object of the invention is to provide a separator as stated above, wherein the foreign materials can be removed from various sizes of the granulated materials.

Further objects and advantages of the invention will be apparent from the following description of the invention.

SUMMARY OF THE INVENTION

In accordance with the present invention, a separator is designed to remove foreign materials, such as small stones, included in granulated or round materials, such as red beans, having smooth outer surfaces. The separator is basically formed of a supplying section for providing the granulated materials with the foreign materials, and a separating section for receiving the granulated materials with the foreign materials and separating the foreign materials from the granulated materials.

The separating section includes at least one pair of elongated rollers formed of first and second rollers, which are arranged parallel to and at a predetermined distance spaced apart from each other, and means for rotating the rollers in opposite directions. The first roller has a spiral projection on an outer surface thereof.

When the granulated materials with the foreign materials are supplied onto one side or end of the pair of rollers, the foreign materials are caught between the rollers and dropped downwardly, while the granulated materials are transferred to the other side or end of the rollers by the rotating spiral projection. A large foreign material is caught between the two rollers and crushed. Thus, the foreign materials are completely removed from the granulated materials.

Preferably, the second roller has a frictional surface thereon to easily catch the foreign materials together with the first roller. Also, the pair of rollers may have a wide space portion at the other end of the rollers. The granulated materials supported on the pair of rollers and transferred by the spiral projection to the other end are ejected through the wide space portion.

The height of the spiral projection and the distance between the two rollers are adjusted based on the size of the granulated material to be processed.

DETAILED DESCRIPTION OF A PREFERRED EMBODIMENT

Figure 1:
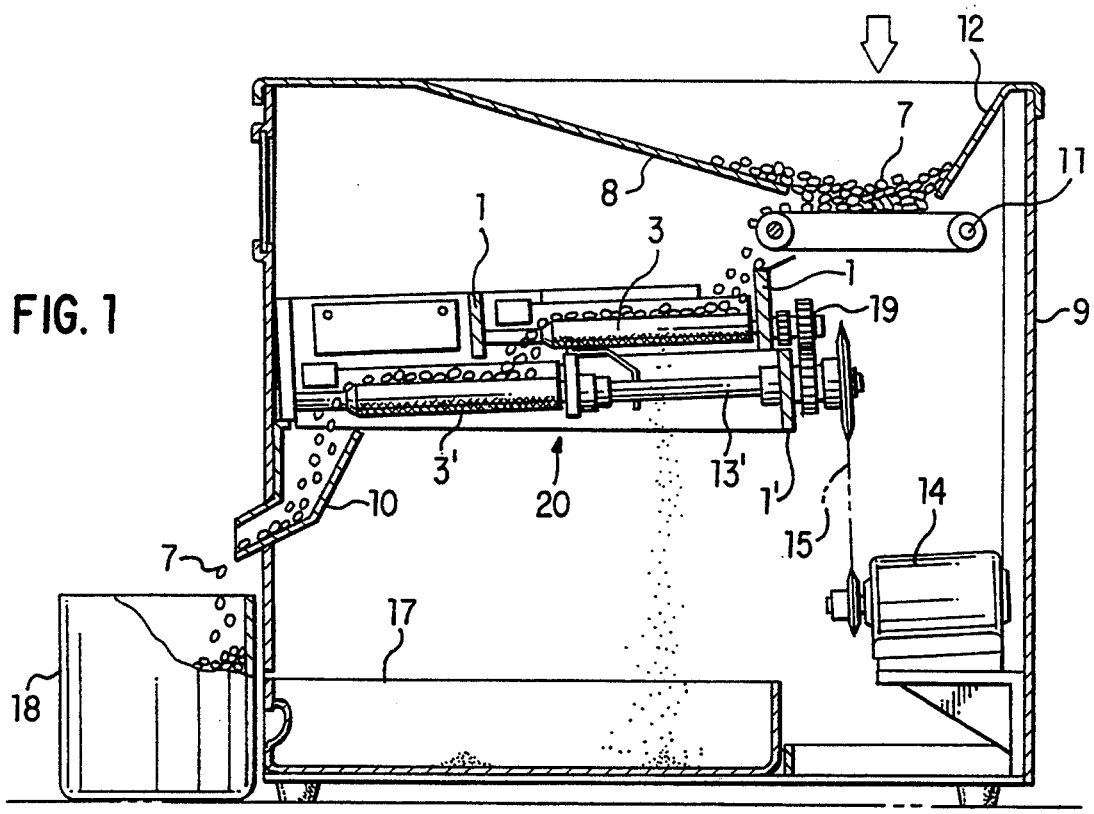
FIG. 1 is a side section view for showing a separator of the invention.
Figure 2:
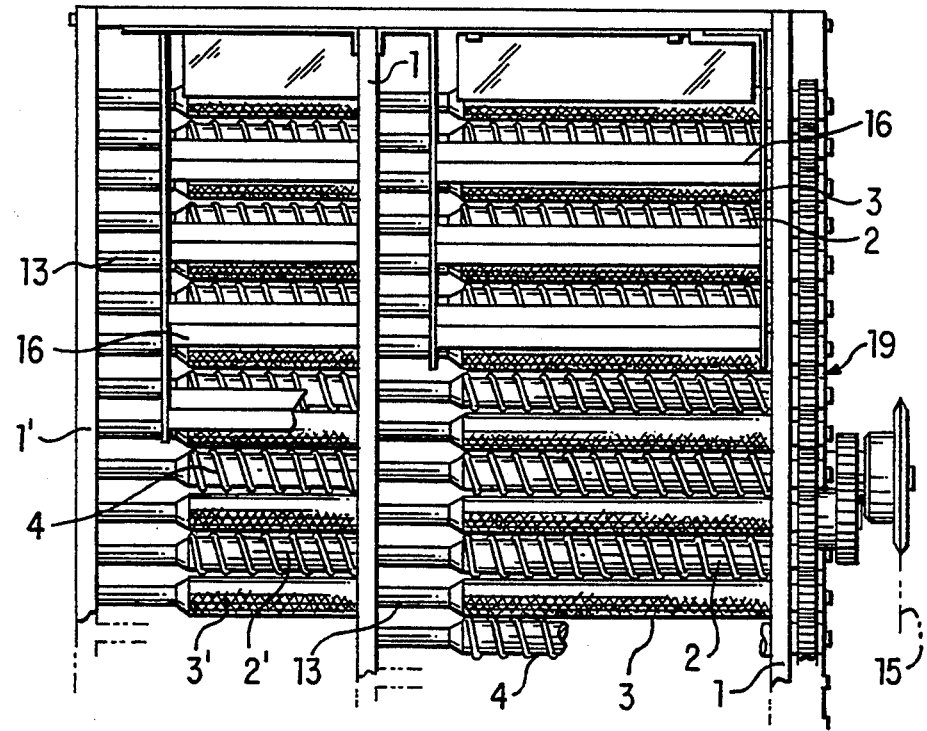
FIG. 2 is an explanatory plan view of a part of the separator of the invention.
Figure 3:
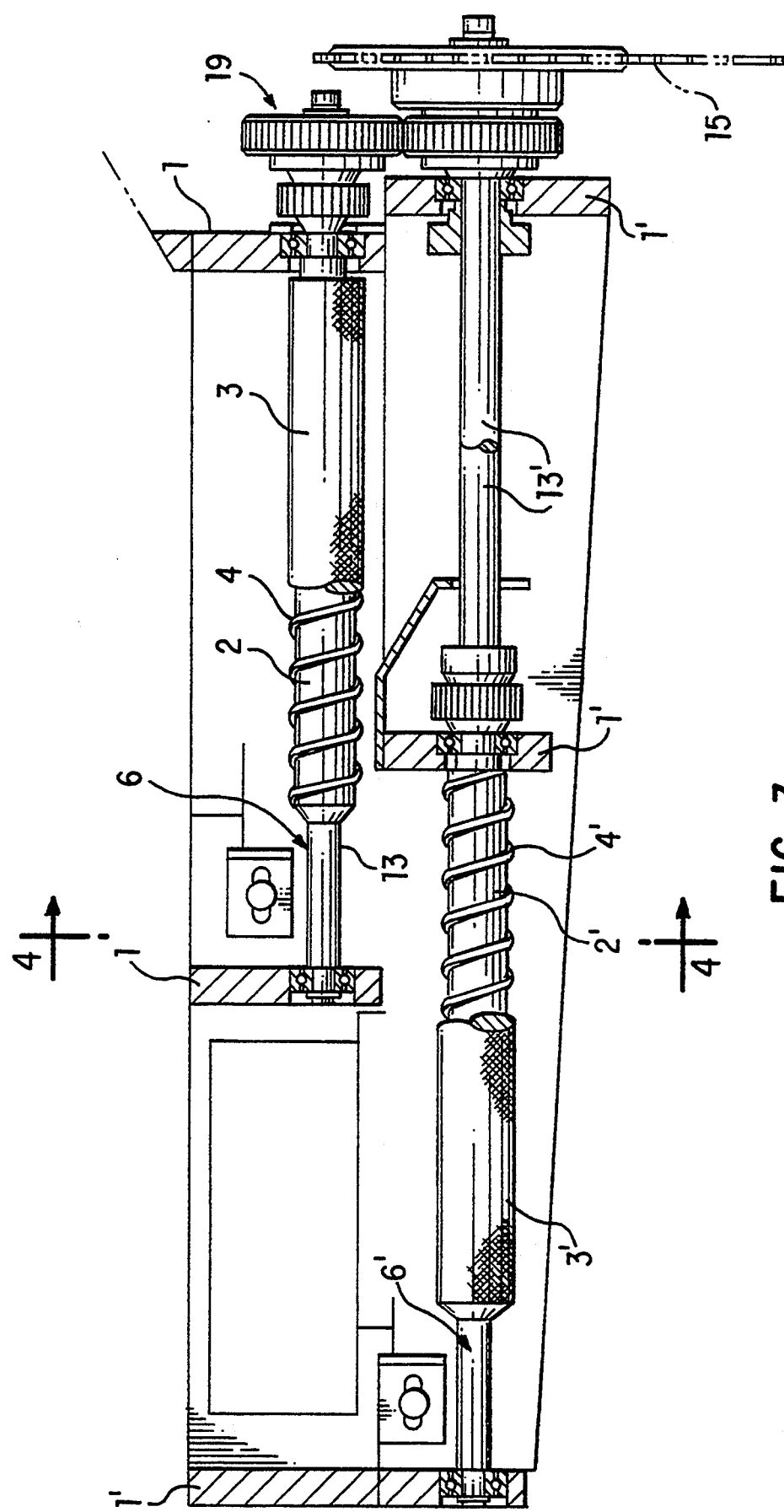
FIG. 3 is an enlarged side view of a part of the separator of the invention.
Figure 4:
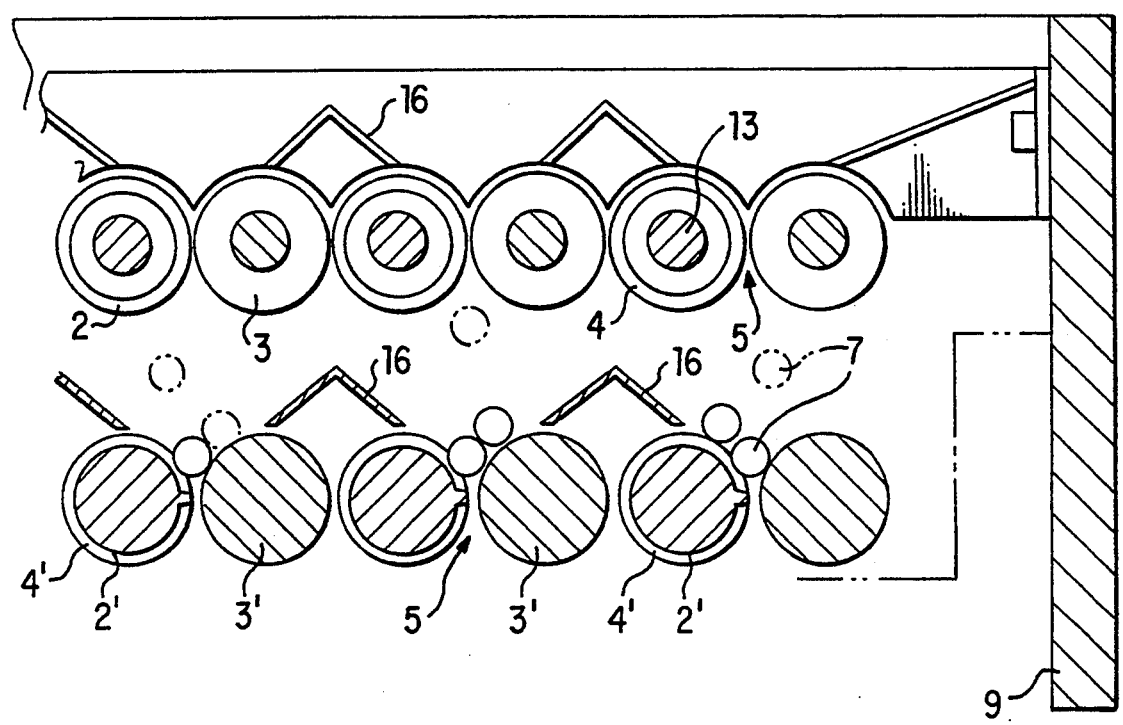
FIG. 4 is a section view taken along a ling 4—4 in FIG. 3.

As shown in FIG. 1, a separator of the invention includes a housing 9, a material supply portion 8 for receiving granulated materials or red beans 7, with foreign materials, such as small stones and sands, a separating portion 20, and a material outlet portion 10 for ejecting only the granulated materials 7. The foreign materials are removed at the separating portion 20.

The material supply portion 8 is located at the upper part of the housing 9, and is formed of a hopper 12 and a conveyer 11 situated under the hopper 12. The granulated materials 7 containing the foreign materials and supplied to the hopper 12 are transferred to the separating portion 20 by the conveyer 11.

The separating portion 20 includes support plates 1, 1' attached to the housing 9. A plurality of pairs of upper rollers 2, 3 is rotationally supported between the two support plates 1, and a plurality of pairs of lower rollers 2', 3' is located under the upper rollers 2, 3 and supported by the support plates 1'. The rollers 2, 3, 2', 3' are slightly inclined toward the outlet portion 10.

The roller 2 has a spiral projection 4 on an outer surface thereof. The height of the projection 4 from the outer surface of the roller 2 is less than the size or smallest length of the granulated material 7 to be processed. Also, the height of the projection 4 is determined with reference to the inclination of the rollers 2, 3, such that the granulated materials 7 situated on the rollers 2, 3 do not roll beyond the projection 4.

The outer surface of the roller 2 except for the projection 4 is made smooth. The roller 3 has small projections on the outer surface thereof to have friction thereat. If the friction on the roller 3 is too much, the granulated materials 7 may be caught between the rollers 2, 3. Thus, the friction on the roller 3 is determined with reference to the friction of the granulated materials 7. The roller 2 may have a frictional surface.

The distance 5 between the rollers 2, 3 is determined based on the size of the granulated materials to be processed. Namely, in case the granulated material has a large size, the distance 5 between the rollers 2, 3 is spaced apart largely. On the other hand, in case the granulated material has a small size, the distance 5 between the rollers 2, 3 is made small. Namely, the distance 5 is determined such that the granulated materials 7 are not caught between the two rollers 2, 3.

The rollers 2, 3 have long axes 13 at side portions away from the conveyer 11 to form a space 6 therebetween. The space 6 is greater than the size of the granulated material 7. Thus, the granulated materials 7 transferred by the rollers 2, 3 drop downwardly through the space 6.

The rollers 2, 3 include gears 19 at side portions opposite to the space 6. The gears are connected to each other, and are in turn connected to a motor 14 through a belt 15. When the motor 14 is actuated, the rollers 2, 3 are rotated in the opposite directions to receive or pull in the granulated materials between the rollers 2, 3.

The pairs of rollers 2, 3 are arranged side by side so that the granulated materials are processed by a plurality of the pairs of rollers 2, 3. A guide plate 16 is located between the rollers 2, 3 which do not constitute the pair. Thus, the granulated materials are properly supplied onto the pairs of the rollers 2, 3.

Under the pairs of rollers 2, 3, pairs of rollers 2', 3' are arranged so that the granulated materials processed by the rollers 2, 3 are again supplied to the pairs of rollers 2', 3'.

The rollers 2', 3' are almost the same as the rollers 2, 3. Namely, the roller 2' has a projection 4', and the roller 3' has a frictional outer surface. Also, a space 6' is formed between the rollers 2', 3'.

However, the rollers 2', 3' have shafts 13' with gears, which engage the gears 19. Thus, when the motor 14 is actuated, the rollers 2', 3' are rotated together with the rollers 2, 3.

In the housing 9, a tray 17 for receiving the removed foreign materials is disposed. Also, a box 18 is located outside of the housing 9 to receive the granulated materials 7 from the outlet 10.

In the invention, when red beans 7 with small stones are supplied into the hopper 12, the red beans 7 are transferred by the conveyer 11 and are supplied onto ends of the pairs of rollers 2, 3. The red beans 7 are gradually moved by the projections 4 to the space 6, while the small stones fall down through the space between the rollers 2, 3. Since the stones have friction greater than the red beans, even if the stones are greater than the space between the rollers 2, 3, the stones are caught between the rollers 2, 3 and are crushed by the rollers. The crushed stones fall from the rollers 2, 3, and are collected in the tray 17.

The red beans transferred to the ends of the rollers 2, 3 fall down to the end of the rollers 2', 3' through the spaces 6. The red beans 7 on the rollers 2', 3' are processed again and the remaining stones are removed. The red beans falling down through the spaces 6' are collected at the outlet 10 and are supplied to the box 18.

In the invention, small stones and sands are substantially completely removed from the granulated materials 7.

In the invention, the spiral projections 4, 4' are formed around the rollers 2, 2'. The projections 4, 4' operate to keep the granulated materials on the rollers for a sufficient period of time so that the foreign materials are caught between the rollers. If there is no projection, the granulated materials between the two rollers roll down quickly along the rollers, and the foreign materials can not be removed sufficiently.

In the present invention, the rollers 2, 3, 2', 3' are set in two stages. If the rollers 2, 3 are only formed, in case the granulated materials together with foreign materials stick together, the stuck materials may not sufficiently separate from each other by the rollers 2, 3. However, the stuck materials can be separated when the stuck materials fall down to the rollers 2', 3' through the space 6. Thus, the foreign materials can be substantially completely removed from the granulated materials.

Further, in the present invention, in case the shapes of the granulated materials supplied to the hopper are not uniform., while the granulated materials are processed by the rollers, different shapes of the granulated materials are removed. Thus, substantially equal shapes of the granulated materials are obtained at the outlet.

While the invention has been explained with reference to the specific embodiment of the invention, the explanation is illustrative and the invention is limited only by the appended claims.

What is claimed is:

1. A separator for removing foreign materials from granulated materials, comprising:

a supplying section for providing the granulated materials with the foreign materials, and a separating section for receiving the granulated materials with the foreign materials from the supplying section and separating the foreign materials from the granulated materials, said separating section including at least one pair of rollers formed of first and second rollers arranged parallel to and at a predetermined distance spaced apart from each other, another pair of said rollers disposed under said pair of rollers to partly overlap with each other, and means for rotating the rollers in opposite directions, said first roller having a spiral projection on an outer surface thereof and said second roller having a frictional surface thereon so that when the granulated materials with the foreign materials are supplied onto one end of the pair of rollers, the foreign materials are easily caught between the rollers and the granulated materials are transferred to the other end of the rollers, said each pair of rollers having a wide space portion at said other end of the rollers, said granulated materials situated on the pair of rollers and transferred by the spiral portion to said other end being ejected through the wide space portion so that the foreign materials are removed from the granulated materials by the two pairs of the rollers.

2. A separator according to claim 1, wherein height of the spiral projection is lower than a size of the granulated material.

3. A separator according to claim 1, wherein said pairs of the rollers are arranged side by side, respectively.

4. A separator according to claim 3, further comprising a plurality of guide plates situated between two adjacent pairs of rollers so that the granulated materials with the foreign materials are supplied between the first and second rollers.

5. A separator according to claim 3, wherein said supplying section includes a hopper and a conveyer to supply the granulated materials with the foreign materials from the hopper to the rollers.

6. A separator according to claim 1, wherein said granulated material has a smooth outer surface so that frictional coefficient of the granulated material is less than that of the foreign material.

7. A separation according to claim 1, wherein said second roller is made of a hard material so that materials caught between the first and second rollers are crushed.

* * * * *